United States Patent [19]

Datta

[11] 4,299,736
[45] Nov. 10, 1981

[54] CONDUCTIVE MOLDING COMPOSITION AND DISCS THEREFROM

[75] Inventor: Pabitra Datta, Cranbury, N.J.

[73] Assignee: RCA Corporation, New York, N.Y.

[21] Appl. No.: 151,361

[22] Filed: May 19, 1980

[51] Int. Cl.$^3$ ............................................. C08K 9/04
[52] U.S. Cl. ................................. 252/506; 260/42.14; 260/998.16; 252/511; 358/129
[58] Field of Search .......... 260/23 XA, 998.16, 42.14, 260/42.44, 42.49; 106/308 F; 252/506, 511

[56] References Cited

U.S. PATENT DOCUMENTS

| | | | |
|---|---|---|---|
| 3,546,150 | 12/1970 | White et al. .................. | 106/308 F |
| 3,842,194 | 10/1974 | Clemens ....................... | 178/6.6 A |
| 3,842,217 | 10/1974 | Clemens ....................... | 179/100.4 C |
| 3,909,517 | 9/1975 | Clemens ....................... | 178/6.6 A |
| 3,960,790 | 6/1976 | Khanna ........................ | 260/23 XA |
| 4,129,536 | 12/1978 | Martin et al. ................. | 260/23 XA |
| 4,151,132 | 4/1979 | Khanna ........................ | 260/23 XA |
| 4,154,622 | 5/1979 | Momoi et al. ................. | 106/308 F |
| 4,194,921 | 3/1980 | Wheeler et al. ............... | 106/308 F |
| 4,228,050 | 10/1980 | Martin et al. ................. | 260/23 XA |

OTHER PUBLICATIONS

Plastics Design & Processing, Lake Publishing Corp., Jul. 1976, pp. 7–11.

*Primary Examiner*—Paul R. Michl
*Attorney, Agent, or Firm*—B. E. Morris; H. F. VanDenburgh

[57] ABSTRACT

Polyvinyl chloride base molding compositions containing conductive carbon particles which have been treated with a fatty acid chloride have reduced melt viscosities, improved processabilities, and increased electrical conductivities, as well as improved dispersion of the carbon particles in the molding compositions. High density information discs having improved playback performance can be readily molded from these compositions.

18 Claims, 1 Drawing Figure

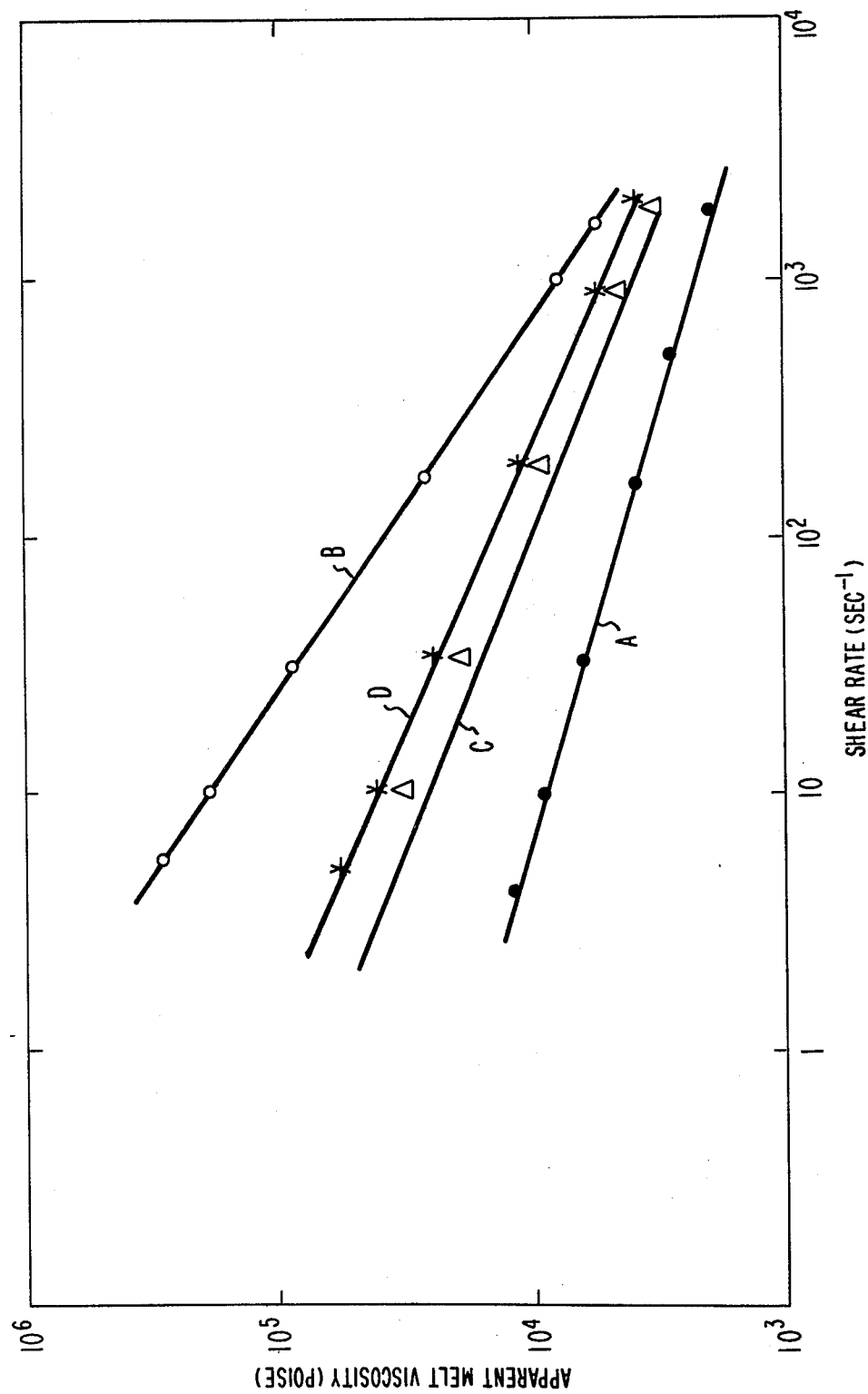

CONDUCTIVE MOLDING COMPOSITION AND DISCS THEREFROM

This invention pertains to an improved conductive molding composition. More particularly, the invention relates to an improved conductive carbon-filled molding composition and a high density information disc produced therefrom having improved playback performance.

BACKGROUND OF THE INVENTION

Clemens, in U.S. Pat. No. 3,842,194; 3,842,217; and 3,909,517, has described a conductive video disc comprising a molded plastic disc having video and audio information in the form of geometric variations in a spiral groove in the disc surface. These discs are coated first with a conductive material, such as a metal, which acts as a first electrode and then with a dielectric layer, such as an inert polymer layer. A metal-tipped stylus acts as a second electrode of a capacitor and the information signals are monitored by the stylus which notes changes in capacitance between the stylus and the disc surface as the information, in the form of depressions, passes beneath the stylus when relative motion is established between the disc and the stylus.

Further developments in this system have produced a video disc which is made of a conductive plastic material, such as a polyvinyl chloride resin containing sufficient amounts of conductive particles, e.g., carbon black, so that the disc can provide capacitance readout. The conductive particles are surrounded by organic material such as the plastic resin, lubricants, and the like, which provide a dielectric surface layer on the conductive particles. This development has eliminated the need for separate coatings of metal and dielectric on the plastic disc and thus has greatly improved the economics of the system.

In other developments, video discs which do not require a grooved surface have also been developed. With this type of disc the stylus is maintained in synchronization with an information pattern by means of electrical signals on either side of the information track, rather than physically by means of the groove walls.

The carbon loaded PVC molding compositions known to date are unsatisfactory in certain respects. One such example of this is that with the addition of large quantities of conductive carbon particles to a molding composition the melt viscosity of the molten molding mixture is greatly increased, which in turn increases the brittleness of the disc molded therefrom. In order to obtain uniform disc replicas having very small and precise information patterns, large quantitites of plasticizers and processing aids have been added to the molding composition. This, unfortunately, also contributes to a low heat distortion temperature of the resin and makes it dimensionally unstable in hot weather, leading to rippling and shrinking which renders the disc unplayable. Thus, research has been continuing to improve the processability of the carbon loaded molding composition, while increasing the heat distortion temperature and the mechanical as well as the electrical properties of the discs molded from these compositions.

SUMMARY OF THE INVENTION

It has been found that carbon black particles modified by a surface treatment with chlorides of long chain fatty acids, prior to their addition to a polyvinylchloride based molding composition, form molding compositions having reduced melt viscosities, improved dispersion of the particles in the molding resin, improved processability and increased electrical conductivity. The resultant molding compositions provide high density information discs having improved playback performance.

BRIEF DESCRIPTION OF THE DRAWING

The single FIGURE of the drawing is a graph representing the apparent melt viscosity of several molding compositions disclosed herein.

DETAILED DESCRIPTION OF THE INVENTION

The carbon black particles suitable for use herein include highly electrically conductive, finely divided carbon blacks, preferably which have a low bulk density. A presently preferred product is commercially available from the Armak Company, Ketjenblack EC, which has an apparent bulk density of about 140-160 grams per liter and an average particle size of about 300 angstroms. These carbon black particles have a high surface area and high proportion of voids within the particles, as measured by dibutyl phthalate absorption. This characteristic enables current to flow between the conductive particles in a non-conductive polymer matrix in a highly efficient manner. Other carbon blacks can also be employed if they meet the electrical requirements. Denser carbon particles will usually require higher loading for an equivalent conductivty, which must be at least 500 ohm-cm at 900 megahertz (MHz) in order for the video signals to be reconstituted on playback with a metal tipped stylus.

According to the present invention, the carbon particles are modified by a surface treatment with a fatty acid chloride or a chloride of a long chain fatty acid prior to their being blended with the PVC based resin to form the molding composition.

The fatty acid chloride used can be a chloride of any long chain fatty acid. However, the preferred fatty acid chlorides are those chlorides of a fatty acid containing from about 5 to about 20 carbon atoms. The most preferred fatty acid chlorides for use in the surface treatment of the conductive carbon black particles and for use in this invention are decanoyl chloride, the chloride of a fatty acid containing 10 carbon atoms, and stearoyl chloride, the chloride of a fatty acid containing 18 carbon atoms.

The modification involving the surface treatment of the conductive carbon black particles is preferably carried out by forming a dilute solvent solution containing from about 1 up to about 2 percent by weight of the fatty acid chloride in a suitable solvent such as toluene. The fatty acid chloride-containing solvent solution is then added to a high speed blender with the carbon black particles and the two materials are blended at high speed for sufficient time to permit the fatty acid chloride to be adsorbed onto the conductive carbon black particles. During the adsorption of the fatty acid chloride to the surface of the conductive carbon black particles there appears to be a chemical bond formed between the fatty acid chloride and the carbon black surface. The thus surface treated carbon black particles are stored and dried prior to their being incorporated into a molding composition.

Thereafter, the resultant modified carbon black particles are added to and blended with, by mixing and extrusion, a PVC resin based molding composition. The surface modified carbon black particles reduce the melt viscosity of the molding composition when compared to the same quantity of non-surface treated or unmodified carbon black particles, and also improve the processability of the molding composition. In addition, the surface modified carbon black particles when added to a molding composition form more uniform dispersions in the composition than do unmodified carbon black particles. Also, molding compositions and articles prepared from these molding compositions containing surface modified carbon black particles have a higher electrical conductivity than those containing unmodified carbon black particles. Furthermore, high density information discs molded from the molding compositions of the present invention exhibit signal to noise ratio and an improved playback performance.

The surface modified conductive carbon black particles may be mixed with any suitable, moldable plastic material. The criteria for choice of the plastic material depends on the physical properties of the material, e.g., moldability, brittleness, heat distortion temperature, melt temperature, melt viscosity, hardness, aging characteristics, and the like, rather than on any particular composition. Many suitable plastic molding compositions are commonly available, including polyvinylchloride homopolymers, polyvinylchloride copolymers and terpolymers with comonomers such as polyvinylacetate, propylene, ethylene, propylene-ethylene copolymers, acrylic polymers and the like.

The chosen plastic can be mixed with various additional ingredients including stabilizers, lubricants, processing aids, modifiers, and the like, as is well known.

Antioxidant stabilizers suitable for the present use include organometallic compounds derived from metals including tin, lead, zinc, barium, and cadmium, such as dibutyl tin-beta-mercaptopropionate, dibutyl tin maleate, and the like. Epoxides, phosphites, and alkylated phenols such as t-butyl catachol can also be employed. Generally, about 1 to 3 percent by weight of the molding composition of a stabilizer is employed.

Internal and external lubricants are also generally added to PVC resin based molding compositions. Suitable lubricants include fatty acids and esters, such as stearic acid, fatty acid esters of alcohols and acids, polyfunctional acid and alcohol esters, soaps including calcium stearate, fatty acid amides such as stearic acid amide, oleamide, ethylene and bis stearamide and the like, and silanes such as dimethyl siloxane. Sufficient lubricant is added to prevent high shear heating during processing and to prevent the composition from sticking to the mold during processing. The presently preferred lubricant system is a mixture of an internal and external lubricant.

Minor amounts, i.e., about 1 to 3 percent by weight of the molding composition, of processing aids, such as polyvinylchloride terpolymers, polymethylmethacrylate polymers and the like, are also generally added to the present molding composition. The amounts of additives employed is dependent upon the particular base PVC resin employed and the amount of conductive particles added as well as the molding procedure to be followed, as is known.

For the high density information discs of this invention, a thin dielectric layer must be present at the surface of the disc. This dielectric layer is generally provided by the presence of a thin film of the molding composition resin around each conductive carbon particle and by the presence of the lubricant in the molding composition which can bleed to the surface, also forming a thin dielectric film. In addition, a thin lubricant film can also be applied as a separate layer on the disc. This film serves as an added dielectric layer and also serves to reduce stylus wear. One lubricant that has been employed successfully is a methylalkylsiloxane of the formula:

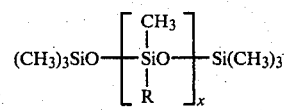

wherein R is an alkyl group of 4 to 20 carbon atoms, and x is an integer, which can be applied by spinning from solution or by evaporation.

The surface treated conductive carbon black particles can be added to the molding composition ingredients either prior to mixing or the same can be added to the molten molded composition. For example, a Banbury mixer and a Brabender apparatus, or a twin screw extruder can be employed to mix and blend the plastic and the modified conductive particles. The filled molding composition can be sheeted on a two roll mill, pelletized and stored for molding at some future time.

For the present indicated use, high density information discs, suitability of the conductive plastic material is also determined by measuring certain dielectrical properties during playback of such molded discs. A test signal is recorded at a carrier frequency of 5 MHz. Carrier level (C) at 5 MHz, measured at millivolts peak to peak, is a function of the resistivity of the filled molding composition and generally increases at lower resistivities. The prior art metal coated discs can provide recovered carrier level of about 7.4 millivolts peak to peak; a similar level is desirable for the present discs, although good pictures can be viewed at lower levels of about 1 millivolt peak to peak.

Another property which measures the quality of the recovered video picture is the carrier to noise level ratio (C/N) obtained during playback of a signal recorded at 5 MHz, which ratio should be as high as possible and at least about 40 decibels (dB) for commercially acceptable video.

The following specific Examples are included in order to illustrate the invention and the improvement thereof with greater particularity; however, it is to be understood that these Examples are not intended to limit the invention in any way.

EXAMPLE I

In order to attain the improvement of this invention, Ketjenblack EC carbon black particles are surface treated with fatty acid chlorides prior to their addition to the molding composition resin. This is done by first forming a dilute solvent solution of the fatty acid chloride in an appropriate solvent, such as toluene, and thereafter treating the carbon particles by suspension in the solvent solution. The fatty acid chloride is added to the toluene, or other suitable solvent, in sufficient amount to make a solution containing from about 1 to about 2 weight percent of the fatty acid chloride in the solvent. Two representative fatty acid chlorides used in these experiments are stearoyl chloride and decanoyl chloride. However, other fatty acid chlorides containing from about 5 up to about 20 carbon atoms are usable to attain the improvement of this invention.

In one specific experiment, sufficient stearoyl chloride was dissolved in toluene to make a 1 weight percent fatty acid chloride solvent solution. Thereafter, 150 grams of Ketjenblack EC carbon particles were placed in a high speed blender and blended for 2 minutes to break up the carbon particles into a fluffy material. Next, 300 grams of the stearoyl chloride solution were slowly added to the carbon particles and the resultant mixture was blended for 5 minutes. It was observed that the solvent solution was adsorbed quickly into the porous structure of the carbon particles. After treatment, the surface treated carbon particles were stored in plastic bags, vacuum dried at 120° C. and restored in polyethylene bags for future use.

In order to confirm the surface treatment of the above stearoyl chloride treated Ketjenblack EC carbon particles, the same, along with untreated Ketjenblack EC carbon particles, were submitted to Fourier transform IR spectroscopy study. In this study both treated and untreated Ketjenblack particles were first vacuum dried at 120° C. and then mixed with potassium bromide to make a suitable pellet. The stearoyl chloride surface treated Ketjenblack particles showed IR spectrum bands associated with aliphatic hydrocarbon and carbonyl ester functional groups which were not present in the IR spectrum of the untreated Ketjenblack particles. Further, IR adsorption bands characteristic of the acid chloride group were not observed in the treated sample. All of the above indicates that the acid chloride groups and the carbon hydroxyl groups reacted with subsequent formation of ester functional groups verifying that the fatty acids are chemically bonded to the surface of the carbon particles.

Similar results to the above were obtained when employing decanoyl chloride as the fatty acid chloride for surface treatment of the Ketjenblack EC carbon black particles.

EXAMPLE II

Mixtures containing fatty acid chloride surface treated carbon black particles and a molding composition comprising 95 parts of AP 480 (a vinyl chloride/8% propylene copolymer of Air Products and Chemicals, Inc.); 2 parts of dibutyl tin-beta-mercaptopropionate stabilizer, available as T 35 from M & T Chemical Company, Inc.; 0.75 part of Loxiol G-30, a monofatty acid ester lubricant of varying molecular weight alcohols and acids, and 0.25 part of Loxiol G-70, a polyfunctional acid ester lubricant, both of which are available from Henkel International GmbH; and 2 parts of K-175, an acrylic resin processing aid available from Rohm and Haas Company, were made in a Waring blender by blending for 4 minutes. The mixtures were then allowed to cool to room temperature, after which 50 part samples were charged to a Brabender plasticorder maintained at 150° C. and 33 rpm, in which the melt torque at equilibrium was determined. The data are summarized below in TABLE 1 where Control A is the molding composition alone without carbon black filler, and Control B is the molding composition containing 15 parts of the untreated carbon back filler. The bandwidth is a measure of processability and elasticity of the resin mixtures. A low bandwidth is an indication of good processability. The equilibrium material temperature is the temperature of the material measured at the equilibrium torque. A low equilibrium material temperature is also an indication of good processability.

TABLE 1

| Sample | Composition | Equilibrium Torque (meter/gram) | Equilibrium Temp. (°C.) | Bandwidth (m/gm) |
|---|---|---|---|---|
| Control A | 100 parts molding composition | 3500 | 156 | 100 |
| Control B | 85 parts molding composition 15 parts carbon black | 5200 | 176 | 350 |
| 1 | 85 parts molding composition 15 parts carbon black (previously treated with a 1 wt. % stearoyl chloride in toluene solution) | 3400 | 160 | 225 |
| 2 | 85 parts molding composition 15 parts carbon black (previously treated with a 1 wt. % decanoyl chloride in toluene solution) | 3600 | 162 | 230 |

With particular reference to the single FIGURE of the drawing, there is shown therein a graph of apparent melt viscosities, as a function of the shear rate, for molding compositions similar to those set forth in Table 1. These apparent melt viscosities were calculated from shear stress and shear rate data determined from these compositions. Line A of the graph is representative of the sample designated Control A in the above Table 1, Line B is representative of the sample designated Control B, Line C is representative of the sample identified as Sample 1, and Line D is representative of the sample designated Sample 2 in the above Table 1. From a study of this graph it can be readily seen that the apparent melt viscosities of those molding compositions wherein the carbon black particles have been surface treated with a fatty acid chloride are substantially lower at all shear rates than for a similar molding composition containing the identical amount of the Ketjen-black particles which have not been previously treated in accordance with this invention.

The results obtained and summarized above indicate that Ketjenblack carbon black particles which have been surface treated with a fatty acid chloride when combined with a polyvinylchloride based resin into a molding composition produce a composition having lower frictional heat and a reduced melt viscosity.

EXAMPLE III

The electrical resistivity of the various sample molding compositions of Example II was determined and compared to the electrical resistivity of a molding composition containing 15 parts of untreated carbon black, Control B of Example II. The data as determined are summarized below in Table 2.

TABLE 2

| Sample | Composition | Resistivity (ohms-cm) AC (at 900 MHz) | DC |
| --- | --- | --- | --- |
| Control B | ( See     ) | 4–6 | 4–10 |
| 1 | ( Table 1 ) | 0.4–1.5 | 0.3 |
| 2 |  | 1.5–2.5 | 2.5 |

It is apparent that the fatty acid chloride surface treated carbon black particles impart improved electrical properties to molding compositions containing them over equivalent amounts of non-treated carbon black particles.

EXAMPLE IV

High density information discs were molded from the surface treated carbon black-containing molding composition of Sample 1 of Example II, as well as from the untreated carbon black-containing molding composition of Control B of Example II. The materials of the molding compositions were mixed in a Brabender single screw extruder and pressed from the disc master described by Clemens above. A thin layer of a methylalkylsiloxane lubricant available from General Electric Company, as SF-1147, was evaporated onto the surface of each disc.

The resultant discs were played with a diamond stylus in a playback system as also described by Clemens above. The average disc fabricated from the molding composition of Sample 1 was determined to have a better carrier output, a better video carrier-to-noise ratio, a better audio signal-to-noise ratio, and seemed to play better than the average disc fabricated from the molding composition of Control B (see Table 3 below).

Carrier distress time, defined as the amount of time in second (but discounting intervals of less than 10 microseconds) during total disc playback when the RF output of the player arm is less than 150 millivolts peak-to-peak, and the time when the RF output gave about 8.6 MHz or below 3.1 MHz in frequency, indicating a defect. Such defects are noted by the viewer as dropouts. The pass criterion for a video disc is a maximum 3 seconds in 30 minutes of playback time, and good video quality is considered to be less than 0.3 second in 30 minutes of playback time. The time was measured for a group of 6 discs and averaged. The discs were played once, then stressed by storing in a chamber for 44 hours at 90 percent relative humidity and 100° F. and replayed twice. A wear test was then conducted by playing the same outer 12 minute band 40 times, which was then followed by 1 post-wear play of 10 minutes in the same outer band. The carrier distress time recorded in this final play was normalized to 30 minutes by multiplying by 3. In addition, stylus wear was noted by measuring the stylus before and after the above plays. Data determined in these tests are summarized below in Table 3. The molding composition for the discs are set forth in Example 2 and Table 1.

TABLE 3

| Disc Composition | Carrier Output millivolt peak-to-peak | Video Carrier-to-Noise Ratio- dB | Audio Carrier-to-Noise Ratio- dB | Carrier Distress Time, Sec./30 min. | | | After Wear Test | Stylus Wear ($\mu^3$/hr.) |
| --- | --- | --- | --- | --- | --- | --- | --- | --- |
| | | | | Initial Play | After Stress 1st play | 2nd play | | |
| Control B | 1.3–3.5 | 44–48 | 22–24 | .1–1 | 3–10 | 1–2 | 1–3 | .08 |
| Sample 1 | 7.9–13 | 48–52 | 25–28 | .1–1 | 3.3–5.9 | 3.1–4.1 | 0.3 | .03 |

What is claimed is

1. In a high density information recording medium, adapted for use with a playback stylus to effect recovery of signals occupying a bandwidth of at least several megahertz when relative motion at a desired rate is established between said recording medium and said stylus, said recording medium comprising a disc of molded plastic material containing a sufficient amount of finely divided conductive particles so that the material has a bulk resistivity below about 500 ohm-cm at 900 MHz and having an information track constituted by a surface relief pattern in said track whereby said signals are recovered upon establishment of said motion at said rate, the improvement which comprises employing as said conductive particles carbon black particles the surfaces of which have been treated with a chloride of a long-chain fatty acid.

2. The recording medium according to claim 1 wherein said carbon black particles have an apparent bulk density of about 140–160 grams per liter.

3. The recording medium according to claim 1 wherein said disc has a spiral groove on the surface containing said information track with said groove being dimensioned for reception therein of said playback stylus.

4. The recording medium according to claim 1 wherein said plastic material is a polyvinylchloride molding composition.

5. The recording medium according to claim 1 wherein said carbon black particles are surface treated with said chloride of a long-chain fatty acid prior to their incorporation into said plastic material.

6. The recording medium according to claim 1 wherein said carbon black particles are surface treated by being suspended in a solvent solution of said chloride of a long-chain fatty acid.

7. The recording medium according to claim 1 wherein said chloride of a long-chain fatty acid contains from about 5 to about 20 carbon atoms.

8. The recording medium according to claim 1 wherein said chloride of a long chain fatty acid is selected from the group consisting of stearoyl chloride and decanoyl chloride.

9. The recording medium according to claim 1 wherein a layer of methylalkylsiloxane lubricant of the formula:

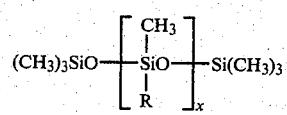

wherein R is an alkyl group of 4 to 20 carbon atoms and x is an integer is disposed over the recording medium.

10. In a conductive molding composition comprising a polyvinylchloride polymer, a solid mercapto tin stabilizer, an acrylic processing aid, an internal lubricant and a sufficient amount of conductive particles so that the composition has a bulk resistivity below about 500 ohm-cm at 900 MHz, the improvement which comprises employing as said conductive particles carbon black particles the surfaces of which have been treated with a chloride of a long-chain fatty acid.

11. The conductive molding composition according to claim 10 wherein said carbon black particles have an apparent bulk density of about 140–160 grams per liter.

12. The conductive molding composition according to claim 10 wherein said internal lubricant is a mixture of at least two lubricants, one an ester wax of monofatty acids and alcohols, and the other an ester wax of polyfunctional acids and alcohols.

13. The conductive molding composition according to claim 10 wherein said stabilizer is present in an amount from about 1 to about 3 percent by weight of the molding composition.

14. The conductive molding composition according to claim 10 wherein said processing aid is present in an amount from about 1 to about 3 percent by weight of the molding composition.

15. The conductive molding composition according to claim 10 wherein said carbon black particles are surface treated with said chloride of a long-chain fatty acid prior to their incorporation into the molding composition.

16. The conductive molding composition according to claim 10 wherein said carbon black particles are surface treated by being suspended in a solvent solution of said chloride of a long-chain fatty acid.

17. The conductive molding composition according to claim 10 wherein said chloride of a long-chain fatty acid contains from about 5 to about 20 carbon atoms.

18. The conductive molding composition according to claim 10 wherein said chloride of a long-chain fatty acid is chloride selected from the group consisting of stearoyl chloride and decanoyl chloride.

* * * * *